US006781970B1

(12) United States Patent
Ovesjö et al.

(10) Patent No.: US 6,781,970 B1
(45) Date of Patent: Aug. 24, 2004

(54) TRANSPORT FORMAT COMBINATION INDICATOR MAPPING FOR TELECOMMUNICATIONS

(75) Inventors: Fredrik Bengt Ovesjö, Stockholm (SE); Ralf Dieter Kukla, Nürnberg (DE); Joakim Karl Olof, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 696 days.

(21) Appl. No.: 09/643,980

(22) Filed: Aug. 23, 2000

Related U.S. Application Data

(60) Provisional application No. 60/151,047, filed on Aug. 27, 1999.

(51) Int. Cl.[7] .................................................. H04Q 7/00
(52) U.S. Cl. ........................ 370/328; 370/535; 370/466
(58) Field of Search ................................ 370/465, 469, 370/342, 252, 336, 331, 231, 401, 536, 328, 535, 466

(56) References Cited

U.S. PATENT DOCUMENTS 6,480,481 B1 * 11/2002 Park et al. ................... 370/342
6,661,777 B1 * 12/2003 Blanc et al. ................. 370/252

FOREIGN PATENT DOCUMENTS

| EP | 0 991 218 A | 4/2000 |
| EP | 1 001 642 A | 5/2000 |
| WO | 00/28760 | 5/2000 |

OTHER PUBLICATIONS

Dahlman et al, "WCDMA—The Radio Interface for Future Mobile Multimedia Communications", IEEE Transactions on Vehicular Technology, vol. 47, No. 4, Nov. 1998, pp. 1105–1118.

Dahlman et al, "UMTS/IMT–2000 Based on Wideband CDMA", IEEE Communications Magazine, Sep. 1998, pp. 70–80.

* cited by examiner

*Primary Examiner*—Ajit Patel
*Assistant Examiner*—Yvonne Quy Ha
(74) *Attorney, Agent, or Firm*—Nixon & Vanderhye, P.C.

(57) ABSTRACT

A Calculated Transport Format Combination (CTFC) provides efficient signalling of transport format combinations to be assigned TFCI values. A sequence of CTFCs is signalled from higher layers (30) to Node B (22) and the user equipment (UE) (20), where each CTFC in order is allocated a TFCI value. From the CTFC both Node B and the user equipment (UE) can determine the exact transport format combinations the TFCI values (used to communicate between Node B and UE) represent. The sequence of CTFC values includes only CTFC values for valid combinations of transport formats.

12 Claims, 3 Drawing Sheets

TRANSPORT FORMAT COMBINATION INDICATOR MAPPING FOR TELECOMMUNICATIONS

This application claims the priority and benefit of U.S. Provisional Patent Application Serial No. 60/151,047, filed Aug. 27, 1999, which is hereby incorporated by reference in its entirety.

BACKGROUND

1. Field of the Invention

The present invention pertains to telecommunications, and particularly to telecommunications operations wherein plural transport channels, each having potential plural transport formats, are multiplexed for transmission.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

The UTRAN uses the Open Systems Interconnection (OSI) reference model. The Open Systems Interconnection (OSI) reference model describes how information from a software application in one computer or telecommunications node moves through a network medium to a software application in another computer or node. The OSI reference model is a conceptual model composed of seven layers, each specifying particular network functions. Each layer is reasonably self-contained, so that the tasks assigned to each layer can be implemented independently. The upper layers of the OSI model deal with application issues and generally are implemented only in software. The highest layer, i.e., the application layer, is closest to the end user. Both users and application-layer processes interact with software applications that contain a communications component. The term upper layer is sometimes used to refer to any layer above another layer in the OSI model. The lower layers of the OSI model handle data transport issues. The physical layer and data-link layer are implemented in hardware and software. The other lower layers generally are implemented only in software. The lowest layer, the physical layer or layer 1, is closest to the physical network medium (the network cabling, for example, and is responsible for actually placing information on the medium).

In telephony, particular mobile telecommunications such as the Universal Mobile Telecommunications (UMTS) Terrestrial Radio Access Network (UTRAN), plural transport channels can be multiplexed over an interface [comprising, e.g., a transmission line or radio frequency(s)]. Assume, for example, that I number of transport channels $TrCH_i$, $i=1, 2, \ldots, I$, are multiplexed, and that each $TrCH_i$ has $L_i$ number of transport formats. Thus, if each transport channel $TrCH_i$ has a format indication $TFI_i$, the format indication $TFI_i$ can take $L_i$ values, $TFI_i$, $\{0,1,2,K,L_i-1\}$. If all combinations of transport formats are allowed, the number of transport format combinations (TFCs) will be $C=L_1 \times L_2 \times \ldots \times L_I$. The number of transport format combinations can become a rather significant number, even with only a few transport channels being multiplexed. In reality, only a subset of all the C TFCs are used. For example, assume a UEP AMR speech service with three transport channels for the three protection classes. AMR has 9 different rates (including DTX), so only 9 TFCs are used. However, in this scenario, C computes to 9×8×3=216 combinations. Similar problems, e.g., a high number of combinations, can arise when considering other service combinations.

Layer 1 of an OSI reference model telecommunications system allocates signaling for a large number of transport format combinations. A Transport Format Combination Indicator (TFCI) informs a receiver of the transport format combination of the CCTrCHs. A current TFCI mapping rule is established in Technical Specification 3GPP TS 25.212 ("3GPP" refers to a project known as the Third Generation Partnership Project (3GPP), which has undertaken to evolve further the UTRAN and GSM-based radio access network technologies). As soon as the TFCI is detected, the transport format combination, and hence the individual transport channel's transport formats, are known by the receiver, so that the receiver can perform decoding of the transport channels.

As it turns out, many transport format combinations are not utilized. Allocating Layer 1 signalling (TFCI) for a large number of transport format combinations, many of which are not used, leads to at least two problems. The first problem is that there may not be enough available TFCI words (64 or 1024). The second problem is that the performance of the TFCI detection depends on how many TFCI code words are in use. There is a significant difference detecting 8 code words out of 64 possible or detecting 64 code words out of 64 possible. Moreover, using a 2×(15,5) code to handle up to 1024 TFCI code words has much worse performance than the 1×(30,6) code that handles up to 64 TFCI code words. Hence, from a performance point of view, one should not allocate TFCI for combinations that are not used.

The current TFCI mapping rule defined in TS 25.212 does not take into account that not all transport format combinations are possible. Hence, the allocation used in used in the TS 25.212 specification can suffer from wasting the TFCI code words.

What is needed, therefore, and an object of the present invention, is an efficient and unambiguous way of mapping each allowed transport format combination (TFC) to a certain Transport Format Combination Indicator (TFCI).

BRIEF SUMMARY OF THE INVENTION

A Calculated Transport Format Combination (CTFC) provides efficient signalling of transport format combinations to be assigned TFCI values. A sequence of CTFCs is signalled from higher layers to Node B and the user equipment unit (UE), where each CTFC in order is allocated a TFCI value. From the CTFC both Node B and the user equipment unit (UE) can determine the exact transport format combinations the TFCI values (used to communicate between Node B and UE) represent.

For I number of transport channels that are included in the transport format combination, with each transport channel $TrCH_i$, I=1, 2, ..., I, having $L_i$ transport formats, i.e. the transport format indicator $TFI_i$ can take $L_i$ values, $TFI_i$0 {0, 1, 2, ..., $L_i$-1}. Let $TFC(TFI_1, TFI_2, ..., TFI_I)$ be the transport format combination for which $TrCH_1$ has transport format $TFI_1$, $TrCH_2$ has transport format $TFI_2$, etc. The corresponding $CTFC(TFI_1, TFI_2, ..., TFI_I)$ is then computed as:

$$CTFC(TFI_1, TFI_2, K, TFI_I) = \sum_{i=1}^{I} TFI_i \cdot P_i.$$

wherein $$P_i = \prod_{j=0}^{i-1} L_j,$$

where i=1, 2, ..., I, and $L_0$=1.

BRIEF DESCRIPTION OF THE DRAWING

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
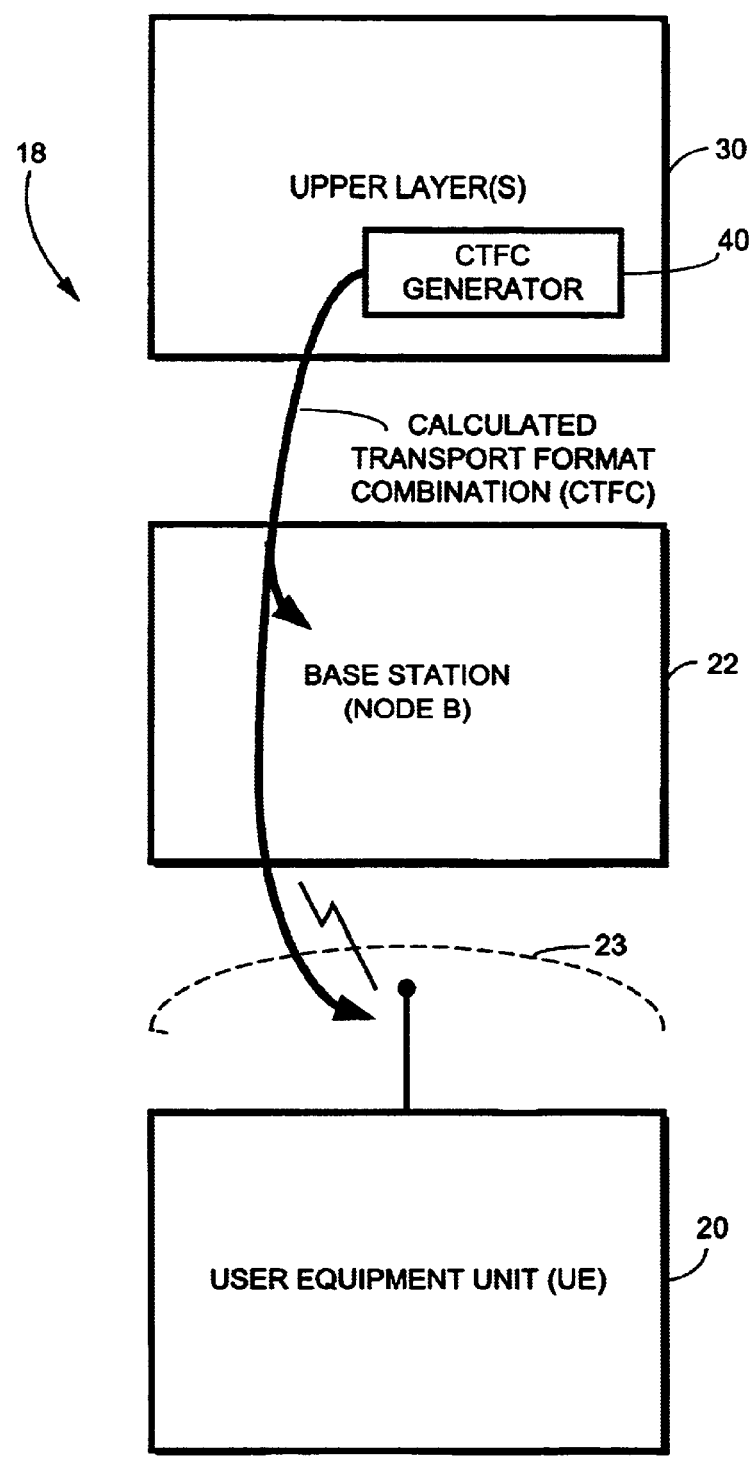
FIG. 1 is a schematic view of portions of a telecommunications network illustrating signaling of a series of CTFC (Calculated Transport Format Combination) values to a node and user equipment unit.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

In accordance with the present invention, different transport format combinations (TFCs) are assigned a different Transport Format Combination Indicator (TFCI) in an efficient manner, so that only actually employed combinations are signaled. In particular, in accordance with the present invention, higher layers signal the used TFCIs to Layer 1, so that each allowed TFC can be unambiguously mapped to a certain TFCI. To signal this mapping in an efficient way, the higher layers compute a value herein referenced as CTFC (Calculated Transport Format Combination). The CTFC is calculated by Expression 1:

Expression 1:

$$P_i = \prod_{j=0}^{i-1} L_j,$$

where i=1, 2, ..., I, and $L_0$=1; and where $L_j$ is the number of transport formats for format indicator $TFI_j$.

Let $TFC(TFI_1, TFI_2, ..., TFI_I)$ be the transport format combination for which $TRCH_1$ has transport $TFI_1$, $TrCH_2$ has transport format $TFI_2$, etc. Now, for any combination of transport formats $TFC(TFI_1, TFI_2, ..., TFI_I)$, the corresponding $CTFC(TFI_1, TFI_2, ..., TFI_I)$ can be computed as shown in Expression 2.

Expression 2:

$$CTFC(TFI_1, TFI_2, K, TFI_I) = \sum_{i=1}^{I} TFI_i \cdot P_i$$

where I is the number of transport channels.

Thus, a unique CTFC value is obtained for all possible combinations of $TFI_1, TFI_2, ..., TFI_I$.

After computing the CTFC value for all allowed transport format combinations, the CTFCs are signalled in order. The TFCIs are assigned in the same order, i.e. the first TFC signalled by its CTFC will correspond to TFCI=0, the next corresponds to TFCI=1, etc.

It is straightforward to calculate the TFIs of a certain TFC's CTFC using the following logic (expressed in C language):

```
m=CTFC;
i=I;
while (I>0) {
    TFI_i=floor (m/P_i);
    m=m % P_i;
    i=i-1;
}
```

Another straightforward way of signalling only allowed TFCs is to signal the TFI for each transport channel for each TFC. However, it can be shown that the number of bits required with the proposed scheme is always less than or equal to the straightforward signalling of the TFIs in the allowed combinations.

The number of bits required to signal one TFC for the straightforward case is A:

$$A = \sum_{i=1}^{I} \lceil \log_2 L_i \rceil$$

For the above-described scheme, the number of bits required to signal a TFC is directly related to the largest possible CTFC value, $CTFC_{max}$.

$$CTFC_{max} = \sum_{i=1}^{I} (L_i - 1)P_i = \sum_{i=1}^{I} (L_i - 1) \prod_{j=0}^{i-1} L_j =$$

$$\sum_{i=1}^{I} \left( \prod_{j=0}^{i} L_j \prod_{j=0}^{i-1} L_j \right) = \prod_{j=0}^{I} L_j - \prod_{j=0}^{0} L_j = \prod_{j=1}^{I} L_j - 1.$$

Now, the number of bits for the proposed scheme is B:

$$B = \lceil \log_2 CTFC_{max} \rceil =$$

$$\left\lceil \log_2 \left( \prod_{j=1}^{I} L_j - 1 \right) \right\rceil \leq \left\lceil \log_2 \left( \prod_{j=1}^{I} L_j \right) \right\rceil = \left\lceil \prod_{j=1}^{I} \log_2 L_j \right\rceil \leq \sum_{j=1}^{I} \lceil \log_2 L_i \rceil = A.$$

Hence, the number of bits required for the above-described scheme of the invention is always less that or equal to what is needed with the straightforward scheme.

One environment for which the invention is applicable is UMTS Terrestrial Radio Access (UMTS being Universal Mobile Telecommunication System). In this regard, see various ETSI standards concerning UTRAN. Details of the signalling can be, for example, as described in RAN WG2.

FIG. 1 shows a telecommunications network 18 in which a user equipment unit (UE) 20 (e.g., a mobile telecommunications device such as a cellular telephone or laptop with mobile termination) communicates with one or more base stations 22 over air interface (e.g., radio interface) 23. Although not explicitly shown as such in FIG. 1, base stations 22 are connected by terrestrial lines (or microwave) to a radio network controller (RNC) [also known as a base station controller (BSC) in some networks], which in turn is typically connected through a control node to circuit-switched telephone networks (PSTN/ISDN) and/or packet-switched networks. A higher layer 30 of the telecommunications network 18 includes a Calculated Transport Format Combination (CTFC) generator 40 which generates a Calculated Transport Format Combination (CTFC) as described above.

FIG. 1 shows by arrow CTFC that signaling of the Calculated Transport Format Combination (CTFC) occurs from a higher layer 30 to Node B (e.g., base station 22) and to receivers in user equipment unit (UE) 20. The functions of higher layer 30 can be located, for example, at a radio network controller (RNC). From the Calculated Transport Format Combination (CTFC), both Node B and the user equipment unit (UE) 20 can determine the exact transport format combinations the TFCI values represent.

Figure 2:
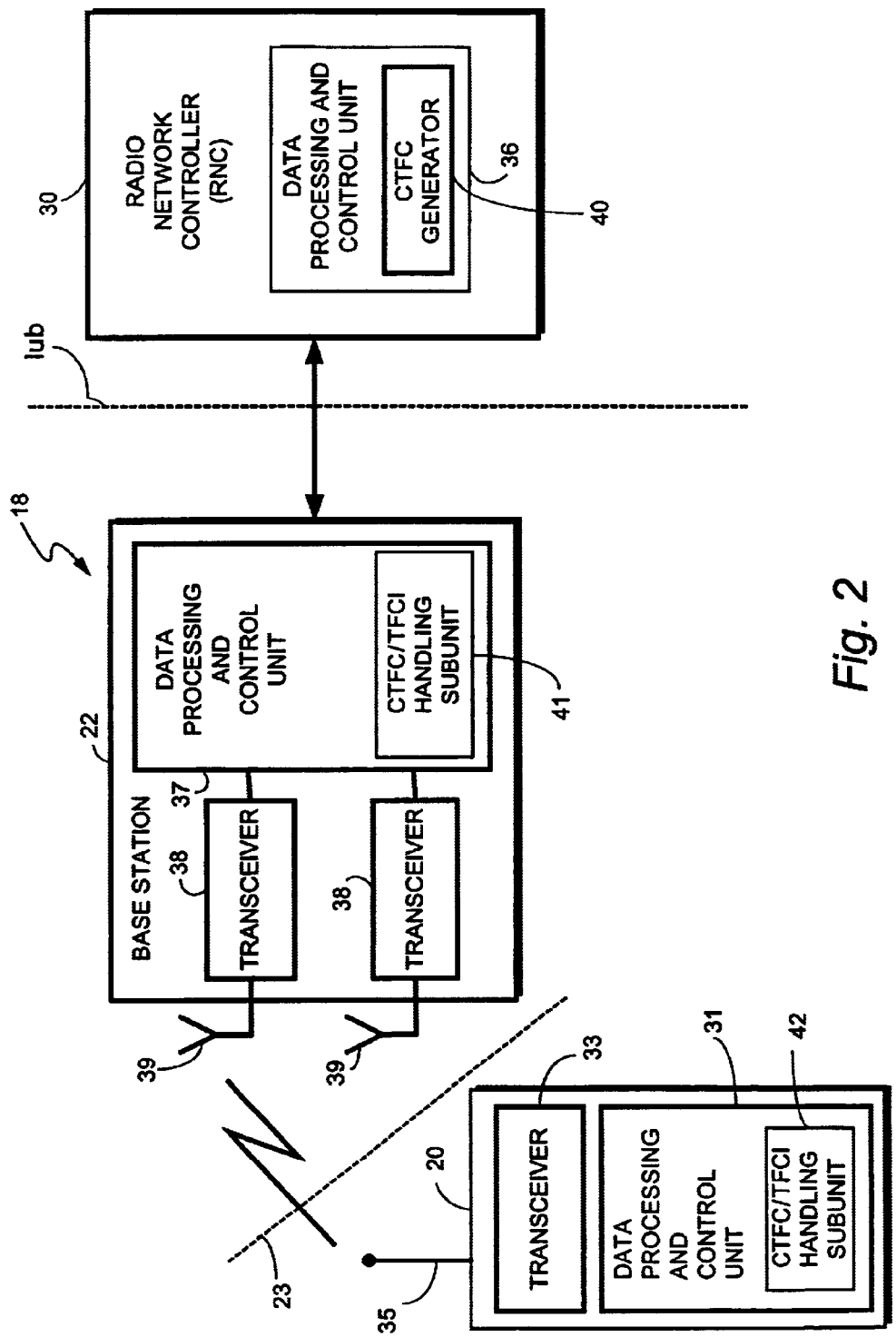
FIG. 2 is schematic view of a portion of a UMTS Terrestrial Radio Access Network which illustrates one example context of the signaling of the series of CTFC (Calculated Transport Format Combination) values, showing in more detail the user equipment unit (UE) station; a base station, and a radio network controller.

In the example implementation of FIG. 2, telecommunications network 18 takes the form of a UMTS Terrestrial Radio Access Network. In this regard, FIG. 2 shows selected additional general aspects of user equipment unit (UE) 20, and illustrative nodes such as the upper layer node (illustrated as radio network controller 30) and base station node 22. The user equipment unit (UE) 20 shown in FIG. 2 includes a data processing and control unit 31 for controlling various operations required by the user equipment unit (UE).

The UE's data processing and control unit 31 provides control signals as well as data to a radio transceiver 33 connected to an antenna 35. The example radio network controller 30 and base station 22 as shown in FIG. 2 are radio network nodes that each include a corresponding data processing and control unit 36 and 37, respectively, for performing numerous radio and data processing operations required to conduct communications between the RNC 30 and the user equipment units (UEs) 20. Part of the equipment controlled by the base station data processing and control unit 37 includes plural radio transceivers 38 connected to one or more antennas 39.

The data processing and control unit of RNC 30 includes the CTFC generator 40 which, as described herein, generates a series of CTFC values which are communicated is both to the base station 22 and the user equipment unit (UE) 20. Certain basic example actions performed by CTFC generator 40 are illustrated subsequently in connection with FIG. 3. At the base station 22 the series of CTFC values are applied to a CFTC/TFCI handling subunit 41. Similarly, at user equipment unit (UE) 20 the series of CTFC values are applied to a CFTC/TFCI handling subunit 42. Various basic example actions performed by CFTC/TFCI handling subunit 41 and CFTC/TFCI handling subunit 42 are illustrated subsequently in connection with FIG. 4 and FIG. 5.

As an example scenario of TFCI mapping scheme described above, assume in the context of FIG. 2 that there are 3 transport channels, with $TFI_1$, {0,1,2}, $TFI_2$, {0,1,2}, $TFI_3$, {0,1}. Further, assume that when $TFI_1$, =0, any combination of $TFI_2$ and $TFI_3$ is allowed, while when $TFI_1$ is not equal to 0 then $TFI_2$ and $TFI_3$ must both be 0.

Figure 3:
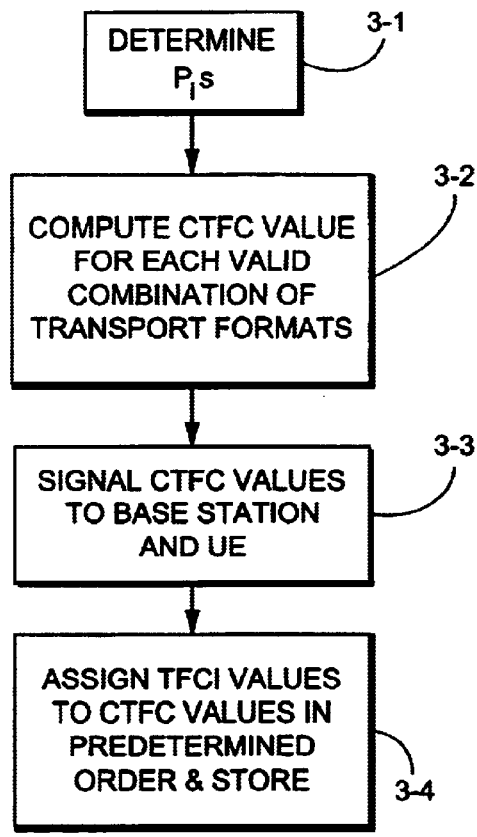
FIG. 3 is a flowchart showing example steps employed in computation and transmission of the series of CTFC (Calculated Transport Format Combination) values from layer 1 of a radio access network to a base station node and a user equipment unit (UE).

FIG. 3 shows basic example steps involved in CTFC generator 40 generating a series of CTFC values which are to be communicated both to base station 22 and user equipment unit (UE) 20. As step 3-1, CTFC generator 40 determines the $P_i$ values to be employed in generation of a series of CTFC values. In connection with the example scenario described by the foregoing assumptions, Expression 1 gives the following values for $P_1$–$P_3$:

$P_1 = L_0 = 1$
$P_2 = L_0 \times L_1 = 1 \times 3 = 3$
$P_3 = L_0 \times L_1 L_2 = 1 \times 3 \times 3 = 9$ As step 3-2, CTFC generator 40 computes a CTFC value for each valid combination of transport formats. Since not all combinations of transport formats may be valid, CTFC generator 40 computes a CTFC value only for each valid combination of transport formats. For the foregoing scenario, Table 1 below lists eight valid combinations (out of a considerably greater number of possible combinations), and a computed CTFC for each valid combination.

TABLE 1

| $TFI_1$ | $TFI_2$ | $TFI_3$ | CTFC | TFCI |
|---|---|---|---|---|
| 0 | 0 | 0 | 0 × 1 + 0 × 3 + 0 × 9 = 0 | 0 |
| 0 | 1 | 0 | 0 × 1 + 1 × 3 + 0 × 9 = 3 | 1 |
| 0 | 2 | 0 | 0 × 1 + 2 × 3 + 0 × 9 = 6 | 2 |
| 0 | 0 | 1 | 0 × 1 + 0 × 3 + 1 × 9 = 9 | 3 |
| 0 | 1 | 1 | 0 × 1 + 1 × 3 + 1 × 9 = 12 | 4 |
| 0 | 2 | 1 | 0 × 1 + 2 × 3 + 1 × 9 = 15 | 5 |
| 1 | 0 | 0 | 1 × 1 + 0 × 3 + 0 × 9 = 1 | 6 |
| 2 | 0 | 0 | 2 × 1 + 0 × 3 + 0 × 9 = 2 | 7 |

As can be seen, e.g., from Table 1, each valid combination results in a different CTFC. To indicate the allowed combinations, as step 3-3 the sequence of CTFCs (0, 3, 6, 9, 12, 15, 1, 2) is signalled to Node B (base station 22) and the user equipment (UE) 20, where each CTFC in order is allocated a TFCI value. As step 3-4, CTFC generator 40 assigns the TFCI values to the respective CFTC values in the series, and stores the same in, e.g., a table or the like. The assignment and storage step 3-4 can precede the signalling of step 3-3.

Figure 4:
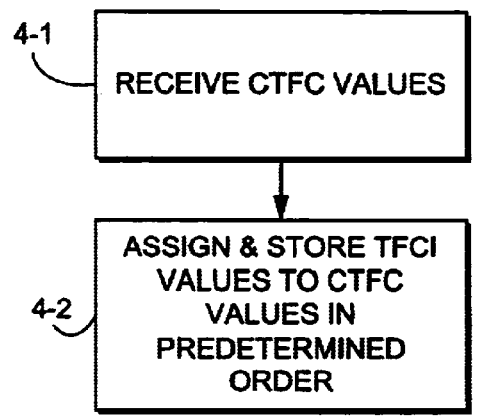
FIG. 4 is a flowchart showing example steps performed by a base station node or a user equipment unit (UE) upon receiving the series of CTFC (Calculated Transport Format Combination) values from layer 1 of a radio access network.

FIG. 4 shows certain basic steps performed by either of base station 22 or user equipment unit (UE) 20 upon receipt of the series of CTFC values (as signalled, e.g., at step 3-3). Actual receipt of the series of CTFC values is depicted by step 4-1. In like manner as step 3-4, at step 4-2 the CFTC/TFCI handling subunits 41 and 42 assigns the TFCI values to the respective CFTC values in the series, and stores the same for future reference.

From the CTFC both Node B and UE can determine the exact transport format combinations the TFCI values (used to communicate between Node B and UE) represent. In this example, signalling each CTFC requires 4 bits, i.e. the total required signalling is 8×4=32 bits. Simply signalling the TFIs of all combinations would require 8×(2+2+1)=40 bits. Thus, the present invention realizes a savings.

Figure 5:
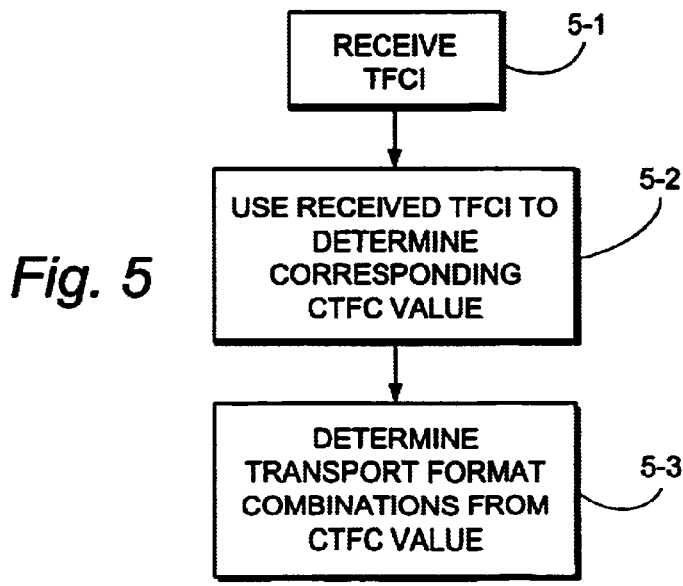
FIG. 5 is a flowchart showing example steps performed by a base station node or a user equipment unit (UE) in determining transport format combinations upon receipt of a TFCI (Transport Format Combination Indicator) value.

Subsequently, when advised of a TFCI by the network, either the CFTC/TFCI handling subunit 41 of base station 22 or the CFTC/TFCI handling subunit 42 of user equipment unit (UE) 20 performs the basic example steps illustrated in FIG. 5. Step 5-1 depicts actual receipt of the TFCI. As step 5-2, the CFTCflFCI handling subunit uses the received TFCI to determine a corresponding CTFC value. Such determination can be made, for example, with reference to the table stored at step 4-2. As step 5-3, the CFTC/TFCI handling subunit determines the transport format combinations from the CTFC value determined at step 5-2.

Thus, the Transport Format Combination Indicator (TFCI) informs the receiver of the transport format combination of the CCTrCHs. As soon as the TFCI is detected, the transport format combination, and hence the individual transport channels' transport formats are known, and decoding of the transport channels can be performed. In accordance with the present invention, the TFCI indicates that a certain transport format combination is signalled from higher layers using the Calculated Transport Format Combination (CFTC). The signalled CTFC is unambiguously associated with a certain TFCI value. How the signalling is performed is described in higher layer specifications. How the CTFC is composed is described in higher layer specifications.

The Calculated Transport Format Combination (CTFC) is thus a tool for efficient signalling of transport format combinations to be assigned TFCI values.

It should be understood that the functions of CTFC generator 40 and TFCI handling subunits 41, 42 can be performed by data processing and control units as illustrated, and that such data processing and control units may or may not perform other tasks for the respective nodes. Moreover, the functions of CTFC generator 40 and TFCI handling subunits 41 and 42 can alternatively be performed by other means, such as (for example) logic circuitry configured for such purposes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications network which computes a Calculated Transport Format Combination (CTFC) which is signaled to at least one of a node of the network and a user equipment unit, the Calculated Transport Format Combination (CTFC) having a value which is decoded to obtain an associated Transport Format Combination Indicator (TFCI) and thereby determine transport format combinations, wherein the Calculated Transport Format Combination (CTFC) is generated by the following expression:

$$CTFC(TFI_1, TFI_2, K, TFI_I) = \sum_{i=1}^{I} TFI_i \cdot P_i,$$

wherein I is a number of transport channels TrCH; wherein $TFC(TFI_1, TFI_2, \ldots, TFI_I)$ is a transport format combination for which transport channel $TrCH_1$ has transport format $TFI_1$, $TrCH_2$ has transport format $TFI_2$, etc., wherein $$P_i = \prod_{j=0}^{i-1} L_j,$$

wherein i=1, 2, ..., I, and $L_0$=1; and wherein $L_j$ is a number of transport channels.

2. The apparatus of claim 1, wherein the Calculated Transport Format Combination (CTFC) is generated by a generator at a node of the network.

3. The apparatus of claim 1, wherein the network computes a sequence of Calculated Transport Format Combination (CTFC) values, the sequence including Calculated Transport Format Combination (CTFC) values only for valid combination of transport formats.

4. The apparatus of claim 1, wherein a sequence of CTFCs is signaled in order to at least one of the node of the network and the user equipment unit, and wherein the at least one of the node of the network and the user equipment unit assigns TFCIs in the same order.

5. A method of operating a telecommunications network comprising:

computing a Calculated Transport Format Combination (CTFC);

signaling the Calculated Transport Format Combination (CTFC) to at least one of a node of the network and a user equipment unit;

decoding the Calculated Transport Format Combination (CTFC) to obtain an associated Transport Format Combination Indicator (TFCI) and thereby determine transport format combinations;

generating the Calculated Transport Format Combination (CTFC) by the following expression:

$$CTFC(TFI_1, TFI_2, K, TFI_I) = \sum_{i=1}^{I} TFI_i \cdot P_i.$$

wherein I is a number of transport channels TrCH; wherein $TFC(TFI_1, TFI_2, \ldots, TFI_I)$ is a transport format combination for which transport channel $TrCH_I$ has transport format $TFI_1$, $TrCH_2$ has transport format $TFI_2$, etc., wherein $$P_i = \prod_{j=0}^{i-1} L_j,$$

wherein i=1, 2, . . . , I, and $L_0$=1; and wherein $L_j$ is a number of transport channels.

6. The method of claim 5, further comprising using a generator at a node of the network to generate the Calculated Transport Format Combination (CTFC).

7. The method of claim 5, further comprising computing a sequence of Calculated Transport Format Combination (CTFC) values, the sequence including Calculated Transport Format Combination (CTFC) values only for valid combination of transport formats.

8. The method of claim 5, further comprising:
signaling a sequence of CTFCs in order to at least one of the node of the network and the user equipment unit, and
assigning TFCIs in the same order at at least one of the node of the network and the user equipment unit.

9. A base station node of a telecommunications network comprising:
means for receiving a Transport Format Combination Indicator (TFCI) from a higher level node of the telecommunications network;
a CTFC/TFCI handling subunit which is arranged to use the received Transport Format Combination Indicator (TFCI) to determine a corresponding Calculated Transport Format Combination (CTFC) value and further arranged to determine, from the Calculated Transport Format Combination (CTFC) value, transport format combinations to be used in communicating with a user equipment unit;
wherein the CTFC/TFCI handling subunit is arranged to use the received Transport Format Combination Indicator (TFCI) to determine a corresponding Calculated Transport Format Combination (CTFC) which has been calculated by the following expression:

$$CTFC(TFI_1, TFI_2, K, TFI_I) = \sum_{i=1}^{I} TFI_i \cdot P_i,$$

wherein I is a number of transport channels TrCH; wherein $TFC(TFI_1, TFI_2, \ldots, TFI_I)$ is a transport format combination for which transport channel $TrCH_1$ has transport format $TFI_1$, $TrCH_2$ has transport format $TFI_2$, etc., wherein $$P_i = \prod_{j=0}^{i-1} L_j,$$

wherein i=1, 2, . . . , I, and $L_0$=1; and wherein $L_j$ is a number of transport channels.

10. The base station of claim 9, wherein the CTFC/TFCI handling subunit is arranged upon receipt of a series of CTFC values to assign respective TFCI values and to store the respective TFCI values.

11. A user equipment unit which is in radio communication with a base station node of a telecommunications network, the user equipment unit comprising:
means for receiving a Transport Format Combination Indicator (TFCI) from a higher level node of the telecommunications network;
a CTFC/TFCI handling subunit which is arranged to use the received Transport Format Combination Indicator (TFCI) to determine a corresponding Calculated Transport Format Combination (CTFC) value and further arranged to determine, from the Calculated Transport Format Combination (CTFC) transport format value, combinations to be used in communicating with the base station node;
wherein the CTFC/TFCI handling subunit is arranged to use the received Transport Format Combination Indicator (TFCI) to determine a corresponding Calculated Transport Format Combination (CTFC) which has been calculated by the following expression:

$$CTFC(TFI_1, TFI_2, K, TFI_I) = \sum_{i=1}^{I} TFI_i \cdot P_i,$$

wherein I is a number of transport channels TrCH; wherein $TFC(TFI_1, TFI_2, \ldots, TFI_I)$ is a transport format combination for which transport channel $TrCH_1$ has transport format $TFI_1$, $TrCH_2$ has transport format $TFI_2$, etc., wherein $$P_i = \prod_{j=0}^{i-1} L_j,$$

wherein i=1, 2, . . . , I, and $L_0$=1; and wherein $L_j$ is a number of transport channels.

12. The base station of claim 11, wherein the CTFC/TFCI handling subunit is arranged upon receipt of a series of CTFC values to assign respective TFCI values and to store the respective TFCI values.

* * * * *

UNITED STATES PATENT AND TRADEMARK OFFICE
CERTIFICATE OF CORRECTION

PATENT NO. : 6,781,970 B1
DATED : August 24, 2004
INVENTOR(S) : Ovesjo et al.

It is certified that error appears in the above-identified patent and that said Letters Patent is hereby corrected as shown below:

Column 8,
Line 29, change "transport channels" to -- transport formats --;

Column 9,
Line 8, change "transport channels" to -- transport formats --; and

Column 10,
Lines 7 and 48, change "transport channels" to -- transport formats --.

Signed and Sealed this

Thirty-first Day of May, 2005

JON W. DUDAS
*Director of the United States Patent and Trademark Office*